US012609137B1

(12) United States Patent
Krishnamurthy et al.

(10) Patent No.: US 12,609,137 B1
(45) Date of Patent: Apr. 21, 2026

(54) NFT BACK REFLECTION MONITOR FOR HEAT-ASSISTED MAGNETIC RECORDING HEAD

(71) Applicant: SEAGATE TECHNOLOGY LLC, Fremont, CA (US)

(72) Inventors: Vivek Krishnamurthy, Eden Prairie, MN (US); Nathaniel Curran Brandt, Saint Paul, MN (US); Yong Luo, Medina, MN (US); Michael Allen Seigler, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/818,961

(22) Filed: Aug. 29, 2024

(51) Int. Cl.
*G11B 7/1263* (2012.01)
*G11B 5/00* (2006.01)
*G11B 5/48* (2006.01)
*G11B 5/60* (2006.01)
*G11B 7/1387* (2012.01)

(52) U.S. Cl.
CPC .......... *G11B 7/1263* (2013.01); *G11B 5/4866* (2013.01); *G11B 5/6088* (2013.01); *G11B 7/1387* (2013.01); *G11B 2005/0021* (2013.01)

(58) Field of Classification Search
CPC ... G11B 7/1263; G11B 5/4866; G11B 5/6088; G11B 7/1387; G11B 2005/0021
See application file for complete search history.

(56) References Cited

U.S. PATENT DOCUMENTS

| | | | |
|---|---|---|---|
| 8,842,506 B1 * | 9/2014 | Matsumoto .......... | G11B 5/6088 |
| | | | 369/13.13 |
| 9,972,350 B1 | 5/2018 | Macken | |
| 11,120,824 B1 | 9/2021 | Peng | |
| 11,574,648 B2 | 2/2023 | Peng | |
| 11,908,499 B1 | 2/2024 | Gubbins | |
| 2020/0098391 A1 * | 3/2020 | Goggin ............... | G11B 5/4866 |

* cited by examiner

*Primary Examiner* — Andrew Sasinowski
(74) *Attorney, Agent, or Firm* — Mueting Raasch Group

(57) ABSTRACT

Disclosed are methods and configurations for monitoring reflections in heat-assisted magnetic recording (HAMR) heads that may lead to laser instability and power variation. HAMR heads direct light emitted by a laser toward a near field transducer (NFT) for the production of plasmons that assist in data recording. A certain amount of the laser light may be reflected at or near the NFT back toward the laser, and this reflected light can cause laser instabilities over time. As a screening measure during manufacturing or assembly, or as a laser health monitoring measure during drive operation, a back reflection monitor is used to detect the intensity of a portion of the reflected light. Back reflection monitoring capability may be provided by a bolometer integrated into HAMR recording head assemblies, and optionally along with optical components and electrical circuitry that provides laser light transmission monitoring capability.

16 Claims, 5 Drawing Sheets

NFT BACK REFLECTION MONITOR FOR HEAT-ASSISTED MAGNETIC RECORDING HEAD

TECHNICAL FIELD

The disclosure generally relates to magnetic recording heads for heat-assisted magnetic recording.

SUMMARY

In accordance with certain aspects, the present disclosure describes heat-assisted magnetic recording heads that include a laser, a near field transducer positioned at an air bearing surface of the recording head and configured to receive light emitted by the laser, a primary waveguide coupled between the laser and the near field transducer and configured to deliver light emitted by the laser to the near field transducer, and a back reflection monitor configured to detect light reflected at or near the near field transducer back toward the laser along the primary waveguide. In certain aspects, the back reflection monitor may be a bolometer or a photodiode.

In certain aspects, a secondary waveguide is configured to couple at least a portion of any light reflected by the near field transducer back toward the laser along the primary waveguide, wherein the back reflection monitor is coupled to the secondary waveguide. The secondary waveguide may be further configured to couple at least a portion of light transmitted along the primary waveguide toward the near field transducer such that it may be detected by a transmission monitor coupled to the secondary waveguide. The secondary waveguide may include a reflection branch, a transmission branch, and a coupler disposed between the reflection branch and the transmission branch, where the coupler is positioned proximate to the primary waveguide to thereby allow coupling of both transmitted light and reflected light propagating along the primary waveguide such that transmitted light coupled into the secondary waveguide is propagated along the transmission branch and reflected light coupled into the secondary waveguide is propagated along the reflection branch. In certain aspects, the back reflection monitor is coupled along the reflection branch of the secondary waveguide and the transmission monitor is coupled along the transmission branch of the secondary waveguide.

In certain aspects, a transmission monitor is configured to detect light transmitted along the primary waveguide toward the near field transducer. For example, the transmission monitor may be disposed within a cladding layer of the primary waveguide.

In certain aspects, a reference sensor is included to detect background temperatures affecting the back reflection monitor.

In accordance with certain aspects, the present disclosure describes heat-assisted magnetic recording hard drives that incorporate the described heat-assisted magnetic recording head.

In accordance with certain aspects, the present disclosure describes methods for testing heat-assisted magnetic recording heads that include a primary waveguide configured to receive light emitted by a laser and to direct the received light toward a near field transducer. Such methods include emitting light from the laser into the primary waveguide such that emitted light is delivered to the near field transducer, and monitoring an intensity of at least a portion of any light that is reflected at or near the near field transducer back toward the laser along the primary waveguide.

In certain aspects, the methods further include determining whether the intensity exceeds a threshold amount. The threshold amount may be correlated to a back reflection intensity that is determined to cause instability in the laser. In certain aspects, the methods may include determining whether the heat-assisted magnetic recording head is suitable for use in a hard disk drive based on whether the intensity exceeds the threshold amount.

In certain aspects, monitoring the intensity during operation of the heat-assisted magnetic recording head in a hard disk drive device is used to determine a health metric of the near field transducer. For example, the intensity may fall within a range that is correlated to a breakpoint of a peg of the near field transducer.

In certain aspects, monitoring the intensity is performed using a bolometer. In certain aspects, the methods include compensating for a background temperature near the bolometer when monitoring the intensity.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
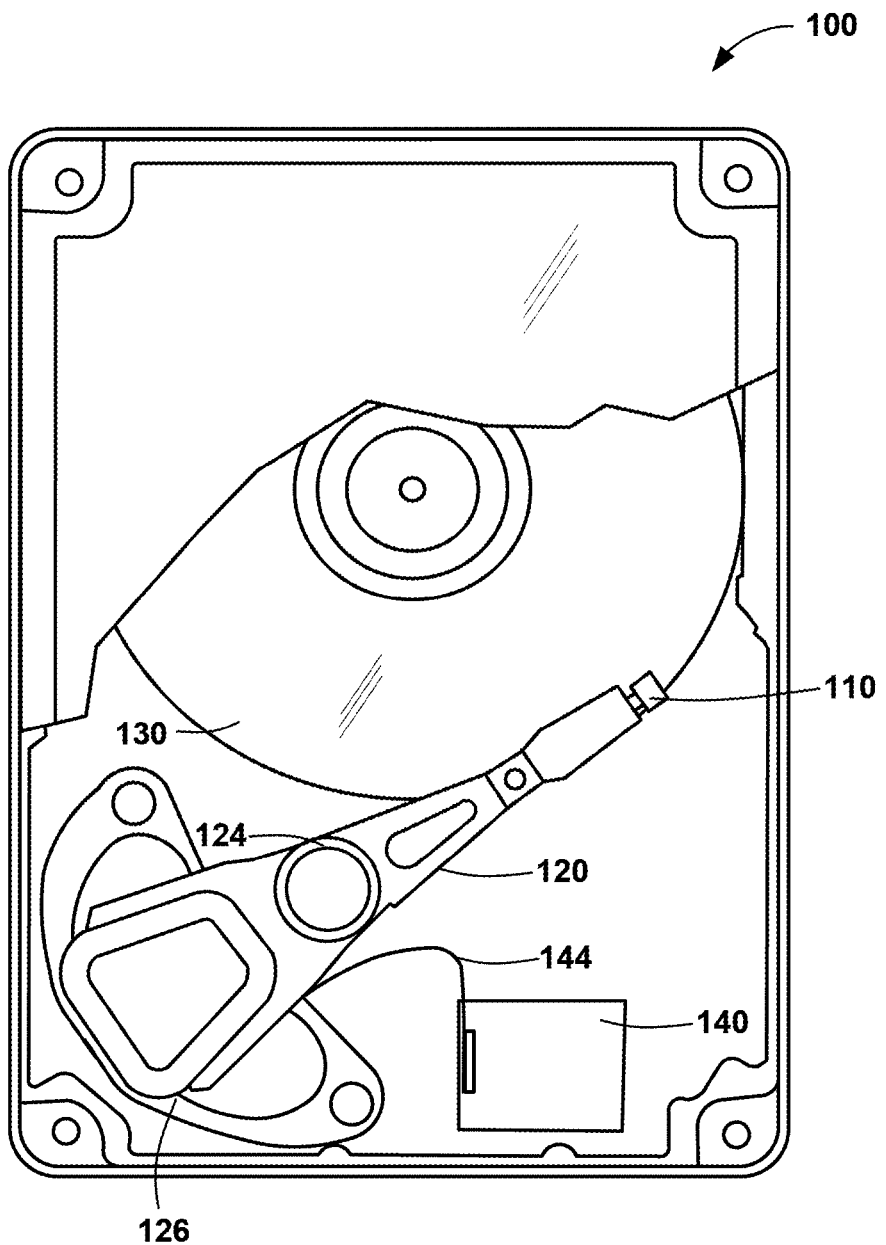
FIG. 1 is a schematic representation of a hard disk drive that may incorporate HAMR recording heads in accordance with aspects of the present disclosure.

The present disclosure generally relates to laser power monitoring in data storage devices that employ heat-assisted magnetic recording (HAMR), and more specifically to monitoring reflections in HAMR recording heads that can lead to laser instability and laser power variations. HAMR uses a laser source to excite a near field transducer (NFT) to thereby generate plasmons that heat a small spot on a magnetic disk during recording. The heat lowers magnetic coercivity at the spot, allowing a write transducer to change the orientation of a magnetic domain at the spot. Due to the relatively high coercivity of the magnetic medium after cooling, the data written into the magnetic medium is less susceptible to paramagnetic effects that can lead to data errors.

During operation, the laser source in a HAMR drive may become unstable due to exposure to laser light that is reflected back toward the laser from components near the air bearing surface of the recording head such as portions of the NFT. Laser light may also be reflected back at the air bearing surface or even from the magnetic media that is proximate to the air bearing surface. In the present disclosure, while it is recognized that many back reflections may occur due to the NFT, deducing the exact mechanism of such back reflections is generally not as important as detecting their presence and amount. For the sake of simplicity and brevity, references to phrases such as "reflected by the NFT," "NFT back reflection," "reflected at or near the NFT," and the like will be understood as referring to the reflection of laser light by components or at interfaces that are located at or near the NFT including the air bearing surface and/or a surface of the recording media. The presence or amount of light reflected back to the laser can vary significantly depending on small variations resulting from various manufacturing and assembly processes, even within normal tolerances of such processes. These reflection-induced laser instabilities can lead to undesired power fluctuations, shifts in laser emission wavelength, mode hopping, and so forth.

As such, in accordance with various aspects of the present disclosure, the capability for back reflection monitoring may be incorporated into HAMR recording head assemblies. Back reflection monitoring can allow the HAMR head assemblies to be tested for the presence of back reflections from the NFT that may exceed a threshold amount. Such NFT back reflection monitoring may be done at various points during manufacturing, testing, head qualification, assembly, and so forth, and for the purposes of process control and/or screening out heads that are likely to produce back reflections that could cause laser instabilities and/or reduce laser lifetimes. Back reflection monitoring may also be performed in situ during operation of a HAMR hard drive in order to estimate the health and remaining lifetime of the laser and/or to determine the health and remaining lifetime of the NFT. For example, certain processing conditions may affect a breakpoint of the peg portion of the NFT, which can in turn result in increased back reflections detectable by the back reflection monitor.

In accordance with various aspects of the present disclosure, monitoring of back reflections can be performed in a HAMR head by directing at least a portion of any light that may be reflected at or near NFT into a back reflection monitor, which may include a bolometer or photodiode, for detection. Back reflection monitor devices may be accommodated by or integrated along with other laser power monitoring features, devices, waveguides, and circuitry that may already be incorporated into a HAMR recording head.

In accordance with various aspects, a back reflection monitor device such as a bolometer may be incorporated in a side branch along the laser waveguide light path to ensure that the back reflection monitor may detect only light that is reflected at or near the air bearing surface. A back reflection monitor device may thereby be placed on a side branch that couples a portion of any light reflected by or around the NFT. Based on the amount of light detected by the back reflection monitor, a signal is produced that correlates to the amount of light reflected at or near the NFT. A bolometer may suitably be used as the back reflection monitor. The signal produced by a bolometer is a resistance change caused by heating due to light incident on the bolometer. When integrated into circuitry of a recording head, which circuitry may include a laser transmission monitor, a temperature reference sensor, and one or more contact sensors at the air bearing surface, the back reflection monitor bolometer may produce a signal that is sensitive enough to detect levels of NFT back reflection useful for the purposes of screening HAMR recording heads.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

FIG. 1 schematically depicts an example HAMR hard disk drive (HDD) device 100 that includes a recording head 110 having read and write capabilities. Recording head 110 is disposed on the end of an actuator arm 120 that is rotationally movable around a pivot 124 by use of a voice coil motor 126. The recording head 110 is positioned in close proximity to the surface of magnetic media disk 130 such that the recording head can write data to and read data from tracks on the magnetic media 130 as it spins by action of a spindle motor (not indicated). Controller electronics 140 may be coupled to the voice coil motor 126 and recording head 110 via a flex cable 144 that connects to traces on the actuator 120. Preamp electronics (not indicated) are typically disposed close to the recording head 110 for conditioning signals to and from the recording head. Controller electronics 140 may also be communicatively coupled to the spindle motor to thereby control the spinning of the media disk(s) 130 along with the movement of the actuator 120 and the reading and writing of data via recording head 110. The internal components of HDD 100 are contained within an enclosure including a cover which is shown partially cut away to reveal the internal components. A host device can communicate with HDD 100 through a standardized interface (not shown).

Recording head 110 includes components needed for writing and reading data to and from the adjacent surface of magnetic media disk 130, including a writer and a reader. In addition to a magnetic write pole, the writer incorporates various components to enable HAMR recording, such as a laser, a waveguide that delivers light from the laser to an NFT near the air bearing surface (also referred to as media facing surface) of the recording head 110. The NFT may include a plasmonic disk and a peg extending toward, and in some instances past, the air bearing surface to facilitate the creation, focusing, and directing of plasmons at the recording surface of the magnetic media 130. The present disclosure may be implemented with any HAMR recording head components now known or later developed that utilize laser light to excite an NFT component.

Figure 2:
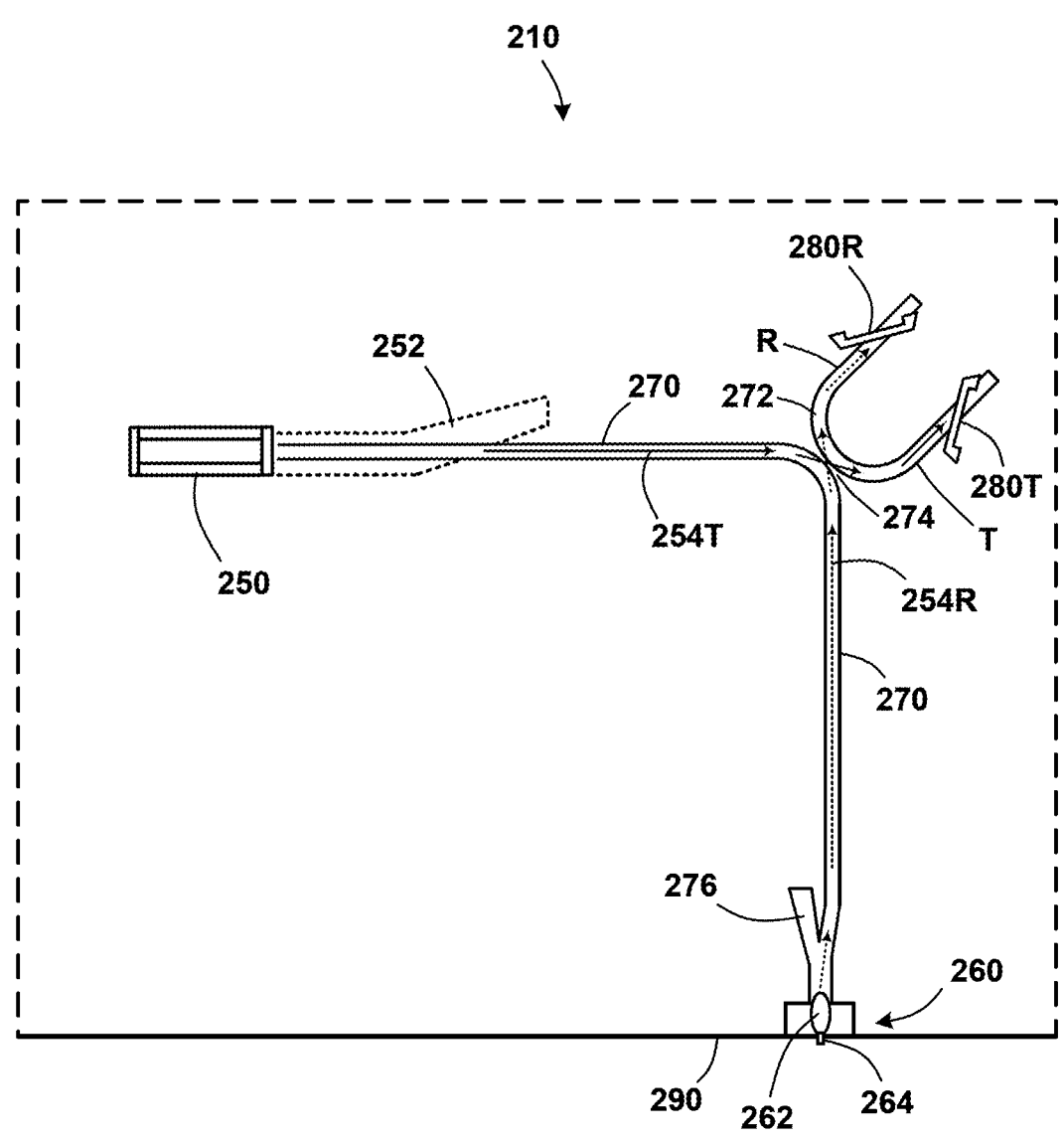
FIG. 2 is a schematic representation of one example of an arrangement of certain optical components of a HAMR recording head in accordance with various aspects of the present disclosure.

FIG. 2 schematically illustrates an example configuration of certain components of a HAMR recording head 210 in accordance with aspects of the present disclosure. Recording head 210 shows only a portion of a recording head and only those components relating to light generation, transmission, delivery, and plasmonic conversion. For the sake of simplicity, the reader, write pole, and various other components are not shown. During HAMR recording, laser 250 emits electromagnetic radiation into waveguide 270 for delivery to NFT 260, which is positioned at the air bearing surface 290 of the recording head 210. Coupler 252 may optionally be used to assist in coupling light from laser 250 into the waveguide 270. Waveguide 270 delivers light from the laser 250 to NFT 260 for producing and focusing plasmons.

Secondary waveguide 272 is configured to receive a portion of the light propagating in the primary waveguide 270. Secondary waveguide 272 may receive a portion of the light through evanescent or multimode interference coupling 274 between primary waveguide 270 and secondary waveguide 272. That is, a segment of secondary waveguide 272 may be disposed sufficiently close to a segment of primary waveguide 270 at coupling location 274 to enable a portion of the light in primary waveguide 270 to couple to and propagate in secondary waveguide 272. The present disclosure contemplates any suitable manner of coupling light that is propagating in the primary waveguide into the secondary waveguide.

Near the air bearing surface 290 and NFT 260, the primary waveguide 270 may optionally include a mode converter 276 configured to convert an optical mode of the light emitted by laser 250 (for example, from a transverse electric mode to a transverse magnetic mode or a higher order transverse electric mode). NFT 260 may be composed of a plasmonic disk 260 that is configured to produce plasmons due to excitation from the light emitted by laser 250, and a peg 264 that extends towards and may protrude from air bearing surface 290, the peg 264 being configured to focus plasmonic radiation toward an adjacent magnetic media recording surface (not shown).

As indicated, transmitted light 254T emitted by laser 250 propagates through waveguide 270 in a transmission direction from the laser 250 to the NFT 260. A portion of transmitted light 254T is coupled into secondary waveguide 272 at coupling location 274, and the coupled light is propagated along a transmission branch T of secondary waveguide 272, and subsequently detected by transmission monitor 280T, which may be a bolometer, a photodiode, or other light detection device. Such transmitted light monitoring is optional in various implementation of the present disclosure. Reflected light 254R is light that was emitted by laser 250 and ultimately reflected at or near NFT 260. Reflected light 254R propagates through waveguide 270 in a reflected direction back toward the laser 250. A portion of the reflected light 254R is coupled into secondary waveguide 272 at coupling location 274, and is propagated along a reflection branch R of secondary waveguide 272, and subsequently detected by back reflection monitor 280R, which may be a bolometer, a photodiode, or other light detection device.

A bolometer suitable for use as a back reflection monitor or as a transmission monitor may be composed of a thin metallic element, such as a wire, with a high thermal coefficient of resistance (TCR). In certain aspects, a reference sensor, such as a resistor, may be situated proximate the bolometric sensor but away from the path of the light being detected, such that the bolometer and reference sensor are on the same isotherm. In other words, a reference sensor may be situated close to the bolometer so that both components are exposed to substantially the same thermal background. The bolometer and the reference sensor are configured and connected to effectively subtract off signal content of the bolometer representative of the thermal background experienced by the bolometer and the reference sensor. Having subtracted off the non-optical thermal component of the bolometer signal, the remaining component of the bolometer signal represents the temperature and temperature variations due predominately or solely to output optical power and power fluctuations of the laser diode. The reference sensor may be a thin metallic element, such as a wire, with a high TCR or other type of resistance sensing apparatus. In some embodiments, the bolometer and reference sensor can have substantially the same geometry (for example, size and shape) and are made of same material (same TCR). When the bolometer and reference sensor are configured in a split-ground circuit, a common mode bias current is applied to both bolometer and reference. Since their resistances are close to each other and are in same thermal environment, a small, fixed voltage drop occurs between them. However, since the bolometer is also in the light path, the voltage drop between the bolometer and the reference sensor increases when the bolometer is exposed to light. As a result, the bolometer can be used to monitor fluctuations in optical power with high fidelity.

Figure 3A:
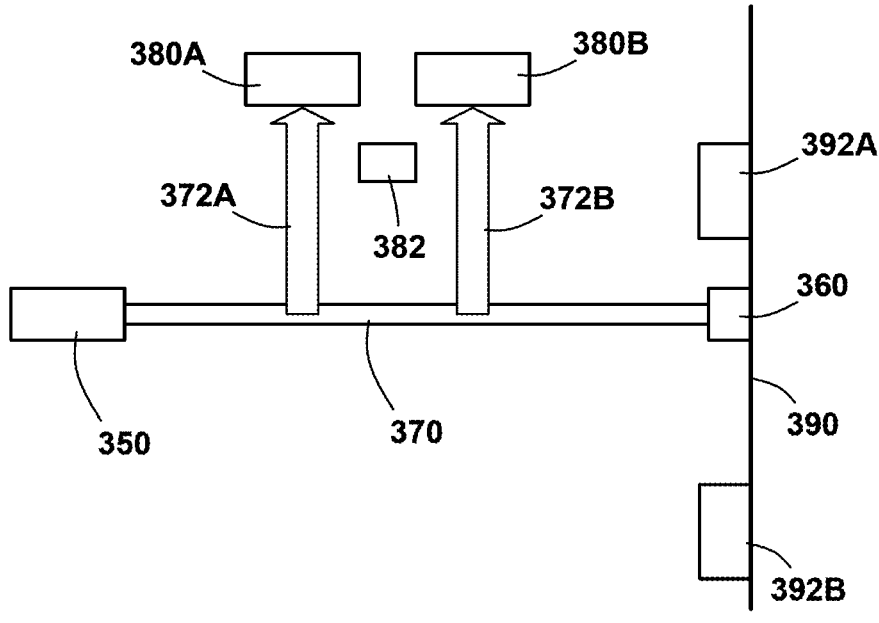
FIGS. 3A and 3B are schematic depictions of example sensor arrangements for monitoring back reflections in HAMR recording heads in accordance with various aspects of the present disclosure.
Figure 3B:
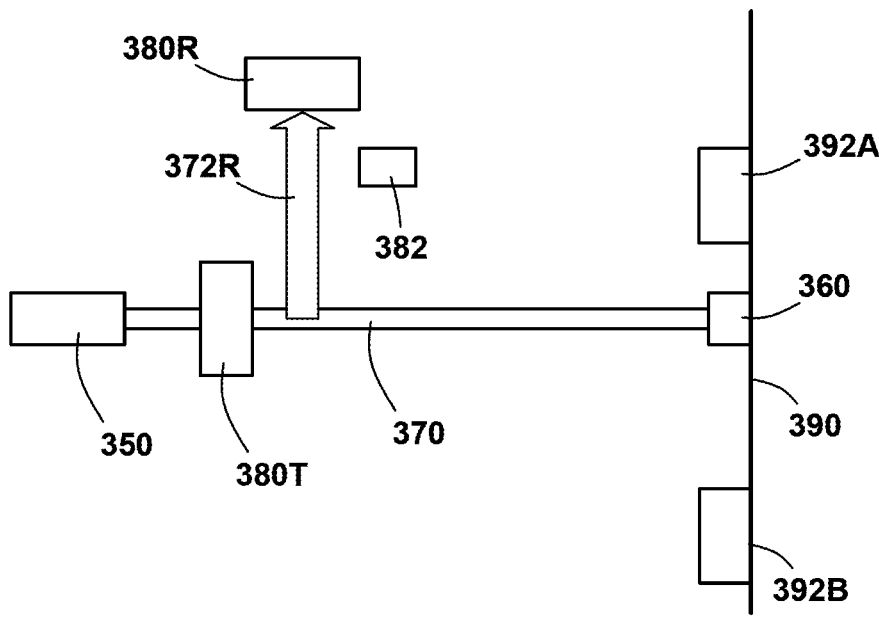

The example configuration shown in FIG. 2 may be generalized, as indicated in FIGS. 3A and 3B, which each schematically depict components for the detection of back reflected light and (optionally) transmitted light in a HAMR recording head. In FIGS. 3A and 3B, a laser 350 is configured to emit light into a waveguide 370 so that the light can be delivered to an NFT 360 at an air bearing surface 390.

In FIG. 3A, a portion of any back reflected light (that is, light reflected by the NFT 360) propagating in the waveguide 370 is coupled 372A and directed to reflection monitor 380A. Optionally, a portion of the transmitted light propagating in the waveguide 370 from the laser 350 toward the NFT 360 may be coupled 372B and directed to transmission monitor 380B. Optionally, a reference senor 382 may be positioned close to back reflection monitor 380A and transmission monitor 380B to cancel out ambient temperature effects. Light couplers 372A and 372B may at different locations along waveguide 370 as indicated in FIG. 3A, or light couplers 372A and 372B may be at the same location along waveguide 370 (such as the example shown in FIG. 2). Also, the roles of couplers 372A and 372B along with detectors 380A and 380B may be reversed such that coupler 372B couples in back reflected light and coupler 372A couples in transmitted light.

In FIG. 3B, a portion of any back reflected light (that is, light reflected at or near the NFT 360) propagating in the waveguide 370 is coupled 372R and directed to reflection monitor 380R. Optionally, a portion of the transmitted light propagating in the waveguide 370 from the laser 350 toward the NFT 360 may be directly detected by transmission monitor 380T, which is placed in the path of waveguide 370 to absorb or harvest light communicated along the waveguide 370. This may be accomplished in a way that minimally or negligibly impacts light transmission, for example by situating a bolometer within the cladding of the waveguide 370. Optionally, a reference senor 382 may be positioned close to back reflection monitor 380R to cancel out ambient temperature effects.

In both of FIGS. 3A and 3B, a first contact sensor 392A and a second contact sensor 392B are situated at or near the air bearing surface 390, with the first contact sensor 392A being preferably situated close to the writer (not shown) and the NFT 360, and the second contact sensor 392B being preferably situated close to the reader (not shown). It is understood that more than two contact sensors can be incorporated. The contact sensors 392A and 392B can be used for setting clearance between the recording head and the media surface, for determining fly height of the recording head over the media surface, and for detecting asperities, voids, and other topographical features of the magnetic media. In certain embodiments, at least one of the contact sensors may be configured to detect contact between the recording head and the magnetic media surface, and the other contact sensor may be a dual-purpose sensor configured to detect asperities as well as head-media contact. The contact sensors 392A and 392B may be implemented as thermal sensors, such as resistive temperature sensors (TCRs), for example dual-ended TCR sensors (DETCRs).

Figure 4A:
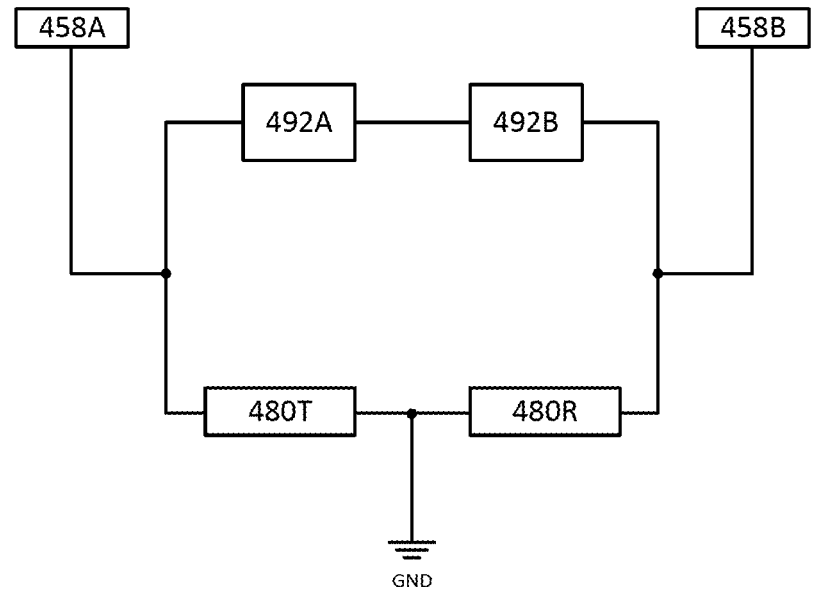
FIGS. 4A and 4B are circuit diagrams for example sensor arrangements for monitoring back reflections in HAMR recording heads in accordance with various aspects of the present disclosure.
Figure 4B:
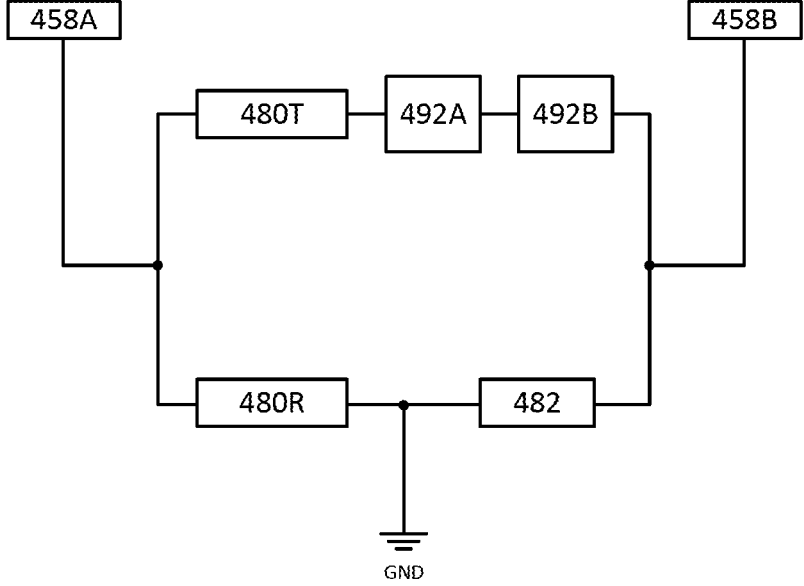

FIGS. 4A and 4B schematically show examples of circuit configurations connecting together an arrangement of sensors that includes bolometers, reference sensors, and contact sensors for inclusion in HAMR recording heads in accordance with various aspects of the present disclosure. As shown in both FIGS. 4A and 4B, the arrangement of sensors is coupled between two bond pads 458A and 458B that are accessible for electrical connection in a HAMR recording head. In both of FIGS. 4A and 4B, it is assumed (as an optional configuration) that contact sensors 492A and 492B share bond pads 458A and 458B with a transmission monitor 480T, a back reflection monitor 480R, and a reference sensor 482. However, in certain embodiments, that may not be the case.

In FIG. 4A, contact sensors 492A and 492B are connected in series between pads 458A and 458B on one side of the circuit. Both of contact sensors 492A and 492B are optional, such that either or both may not be present. If no contact sensors are used, that side of the circuit in FIG. 4A still exists and remains open. Note that the circuit of FIG. 4A does not indicate the use of a reference sensor. In certain configurations, the reflection monitor 480R receives very small signal that itself is sufficient to provide thermal background cancellation to assist with the transmission monitoring provided by transmission monitor 480T.

In FIG. 4B, a circuit is indication in which a transmission monitor 480T is connected between pad 458A and 458B and in series with optional contact sensors 492A and 492B on one side of the circuit, which is opposed to the reflection monitor 480R and optional reference sensor 482. If reference sensor 482 is not included, that part of the circuit may remain open, or the reflection monitor 480R may be connected directly to pad 458B without having the ground connection.

Figure 5:
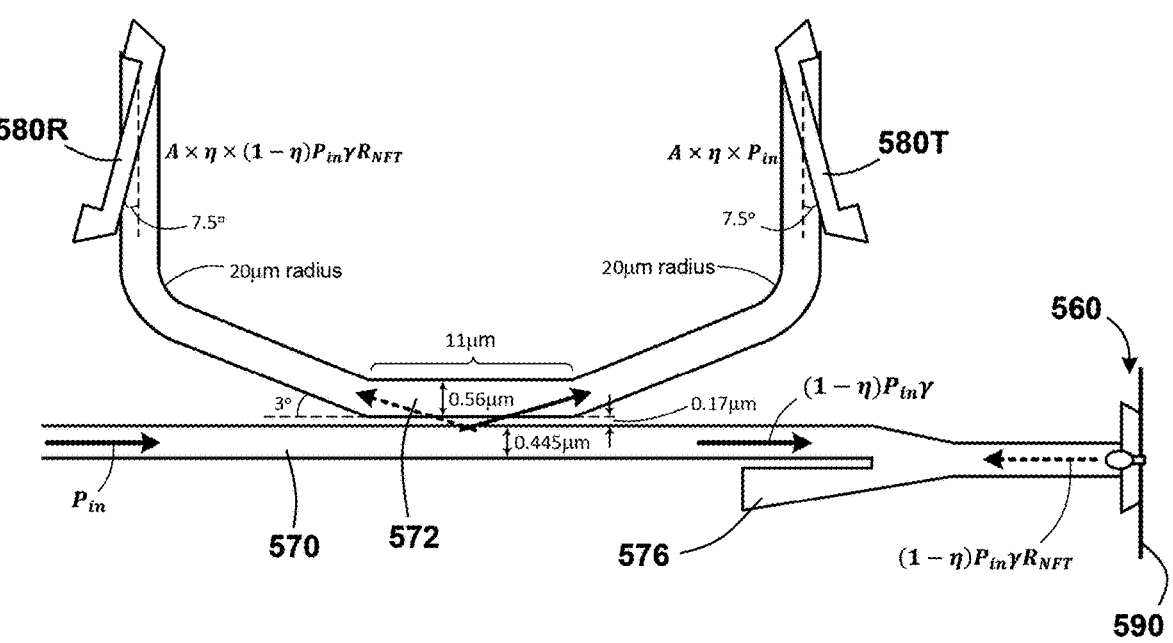
FIG. 5 is a schematic depiction of an example arrangement for coupling light into a back reflection monitor and transmission monitor in accordance with various aspects of the present disclosure.

FIG. 5 schematically depicts an example configuration for coupling a portion of transmitted and back reflected light from a primary waveguide 570 into a secondary waveguide 572 for delivery to a transmission monitor 580T and back reflection monitor 580R, respectively. FIG. 5 indicates example dimensions for the following: a coupling section of secondary waveguide 572 (length of 11 microns); a distance between primary waveguide 570 and secondary waveguide 572 (0.17 micron); a width of the primary waveguide 570 (0.445 microns); a width of the secondary waveguide 572 (0.56 microns); angles of secondary waveguide 572 branches (3 degrees); radii of curvature of secondary waveguide 572 branches (20 micro radius); angles of incidence for transmission monitor 580T and back reflection monitor 580R (7.5 degrees). It will be appreciated that each of these dimensions are examples only, and that other dimensions and configurations may suitably be used. As previously mentioned, other embodiments may be configured in which the transmission monitor 580T is provided as part of the primary waveguide 570 with the reflection monitor 580R being provided as part of the secondary waveguide 572.

FIG. 5 also indicates the initial intensity (Pin) of light emitted by the laser (not shown), as well as the light intensities remaining after coupling into the secondary waveguide, after reflection at or near the NFT, and upon detection by the transmission and reflection monitors, each of which is also indicated in Table 1. The boxed equations in FIG. 5 indicate that the detectable back reflection, which is the back reflection signal normalized to the transmission signal, is proportional to actual back reflections at or near the NFT.

TABLE 1

| Light Intensity | Description |
|---|---|
| $P_{in}$ | Initial intensity from laser |
| $(1 - \eta)P_{in}\gamma$ | Remaining after portion coupled into transmission monitor |
| $(1 - \eta)P_{in}\gamma R_{NFT}$ | Reflected from NFT |
| $A \times \eta \times P_{in}$ | Detected by transmission monitor |
| $A \times \eta \times (1 - \eta)P_{in}\gamma R_{NFT}$ | Detected by reflection monitor | where: A=Bolometer Absorption $\eta$=Branch CE $\gamma$=Mode conversion efficiency It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A heat-assisted magnetic recording head comprising:
a laser;
a near field transducer positioned at an air bearing surface of the recording head and configured to receive light emitted by the laser;
a primary waveguide coupled between the laser and the near field transducer and configured to deliver light emitted by the laser to the near field transducer;
a back reflection monitor configured to detect light reflected at or near the near field transducer back toward the laser along the primary waveguide and that is coupled into the back reflection monitor; and
a transmission monitor separate from the back reflection monitor, the transmission monitor configured to detect light transmitted by the primary waveguide from the laser toward the near field transducer and that is coupled into the transmission monitor.

2. The heat-assisted magnetic recording head of claim 1, wherein the back reflection monitor is a bolometer.

3. The heat-assisted magnetic recording head of claim 1, wherein the back reflection monitor is a photodiode.

4. The heat-assisted magnetic recording head of claim 1, further comprising a secondary waveguide, wherein the back reflection monitor is coupled to the secondary waveguide.

5. The heat-assisted magnetic recording head of claim 4, wherein the transmission monitor is coupled to the secondary waveguide.

6. The heat-assisted magnetic recording head of claim 5, wherein the secondary waveguide comprises a reflection branch, a transmission branch, and a coupler disposed between the reflection branch and the transmission branch, and wherein the coupler is positioned proximate to the primary waveguide to thereby allow coupling of both transmitted light and reflected light propagating along the primary waveguide such that transmitted light coupled into the secondary waveguide is propagated along the transmission branch and reflected light coupled into the secondary waveguide is propagated along the reflection branch.

7. The heat-assisted magnetic recording head of claim 6, wherein the back reflection monitor is coupled along the reflection branch of the secondary waveguide and the transmission monitor is coupled along the transmission branch of the secondary waveguide.

8. The heat-assisted magnetic recording head of claim 1, wherein the transmission monitor is disposed within a cladding layer of the primary waveguide.

9. The heat-assisted magnetic recording head of claim 1, further comprising a reference sensor positioned to detect background temperatures affecting the back reflection monitor.

10. A heat-assisted magnetic recording hard drive incorporating the heat-assisted magnetic recording head of claim 1.

11. A method for testing a heat-assisted magnetic recording head that includes a primary waveguide configured to receive light emitted by a laser and to direct the received light toward a near field transducer, the method comprising:
emitting light from the laser into the primary waveguide such that emitted light is delivered to the near field transducer; and
monitoring an intensity of at least a portion of any light that is reflected by the near field transducer back toward the laser along the primary waveguide, wherein the intensity is used to determine a health metric of the near field transducer that is correlated to a breakpoint of a peg of the near field transducer.

12. The method of claim 11, further comprising determining whether the intensity exceeds a threshold amount.

13. The method of claim 12, wherein the threshold amount is correlated to a back reflection intensity that is determined to cause instability in the laser.

14. The method of claim 12, further comprising determining whether the heat-assisted magnetic recording head is suitable for use in a hard disk drive based on whether the intensity exceeds the threshold amount.

15. The method of claim 11, wherein monitoring the intensity is performed using a bolometer.

16. The method of claim 15, further comprising compensating for a background temperature near the bolometer when monitoring the intensity.

* * * * *